United States Patent [19]

Tupper

[11] 3,714,859
[45] Feb. 6, 1973

[54] ENERGY ABSORBING STRUCTURES

[75] Inventor: Myron D. Tupper, Portland, Oreg.

[73] Assignee: Omark Industries, Inc., Portland, Oreg.

[22] Filed: Sept. 18, 1970

[21] Appl. No.: 73,548

[52] U.S. Cl............85/1 R, 188/1 C, 287/189.36 F, 293/89
[51] Int. Cl......F16b 31/02, F16d 19/00, F16d 63/00
[58] Field of Search.........85/1 R, 1 T, 61, 62, 77, 78, 85/73, 74; 285/2, 93; 297/216; 72/267, 277, 291; 188/1 C; 180/91; 293/84, 89

[56] References Cited

UNITED STATES PATENTS

| | | | |
|---|---|---|---|
| 1,269,064 | 6/1918 | DeLaval | 285/2 |
| 2,615,373 | 10/1952 | Pegard | 188/1 C X |
| 2,682,931 | 7/1954 | Young | 188/1 C |
| 2,892,991 | 6/1959 | Beebee et al. | 285/93 X |
| 3,143,321 | 8/1964 | McGehee et al. | 188/1 C X |
| 3,482,653 | 12/1969 | Maki et al. | 188/1 C |
| 3,504,568 | 4/1970 | Nakamura et al. | 188/1 C X |
| 3,578,376 | 5/1971 | Hasegawa | 297/216 X |
| 3,603,638 | 9/1971 | McGregor | 297/216 |

FOREIGN PATENTS OR APPLICATIONS

| | | | |
|---|---|---|---|
| 993,611 | 6/1965 | Great Britain | 85/77 |
| 998,535 | 7/1965 | Great Britain | 188/1 C |

*Primary Examiner*—Ramon S. Britts
*Attorney*—Buckhorn, Blore, Klarquist and Sparkman

[57] ABSTRACT

Fastener units (FIGS. 1 and 2) include drawable rods having drawable portions and heads of the same diameter and wedging units tensioning the rods. Another fastener unit (FIG. 3) has a die, a threaded head and a nut. A further fastener unit (FIG. 4) has a combined die and threaded plug connected by a frangible portion. Further fastener units (FIGS. 5 to 12) include capscrew-like drawable rods. Another fastener unit (FIGS. 13 and 14) has a drawable rectangular bar. A further fastener unit (FIGS. 15 and 16) has a die holder into which a drawing die strip is inserted from one side. Another fastener unit (FIGS. 17 and 18) includes a drawable spacer sleeve. Other fastener units (FIGS. 19 to 24) include splittable spacer sleeves. Another fastener structure (FIGS. 25 to 28) has extrudable tubes mounting a bumper on a vehicle frame. Another fastener unit (FIGS. 29 and 30) includes a drawing die and a rod bender for absorbing energy. A further fastener unit (FIGS. 31 to 33) has a drawable rod with two tapered drawable portions.

2 Claims, 33 Drawing Figures

PATENTED FEB 6 1973 3,714,859

MYRON D. TUPPER
INVENTOR

BY
BUCKHORN, BLORE, KLARQUIST & SPARKMAN
ATTORNEYS

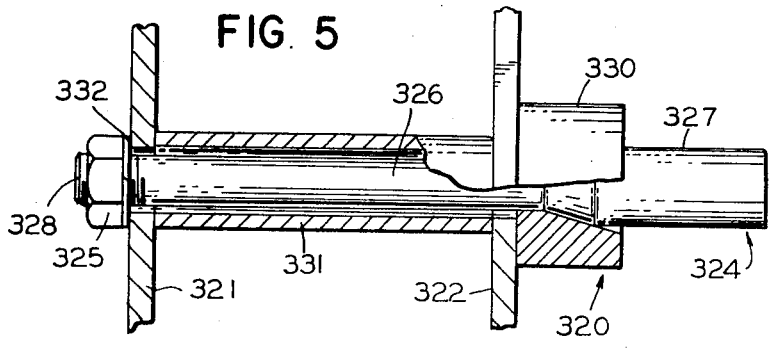
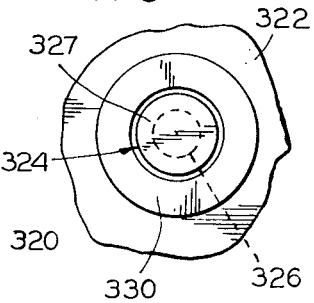
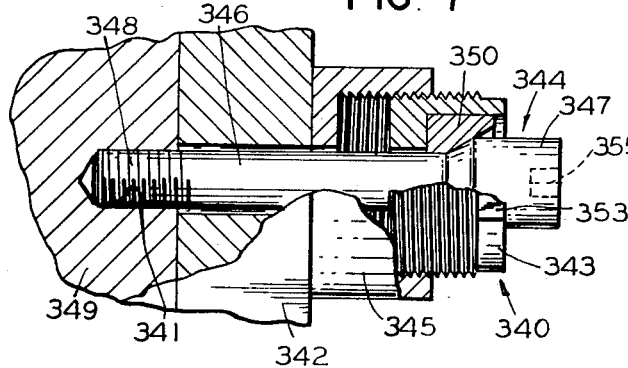
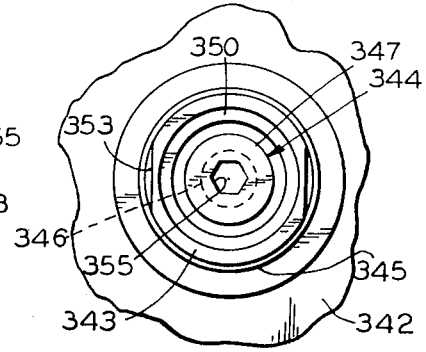
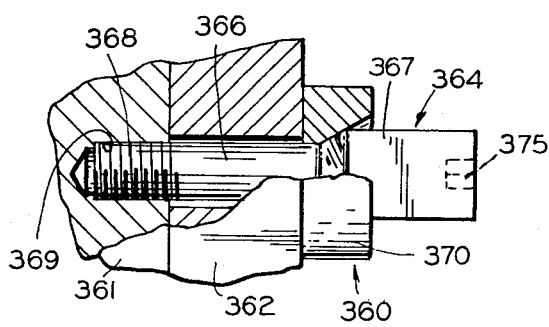
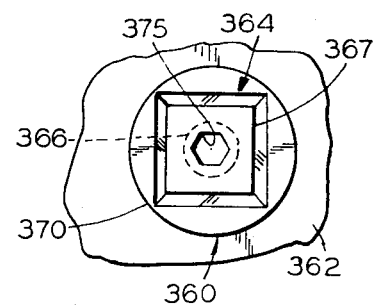

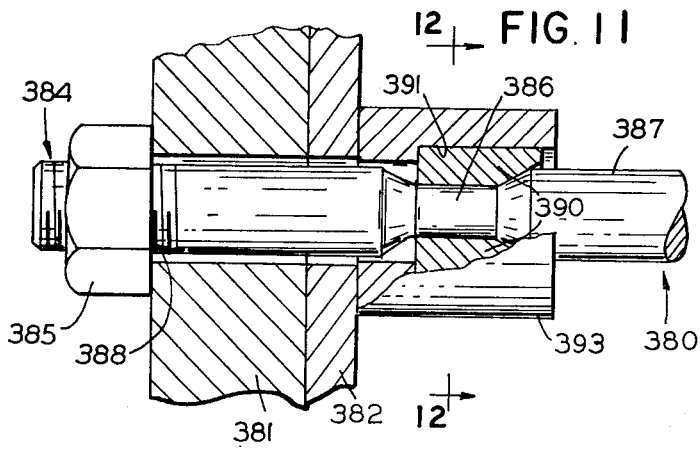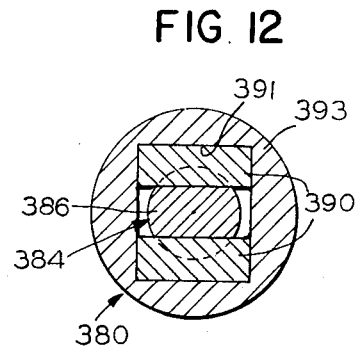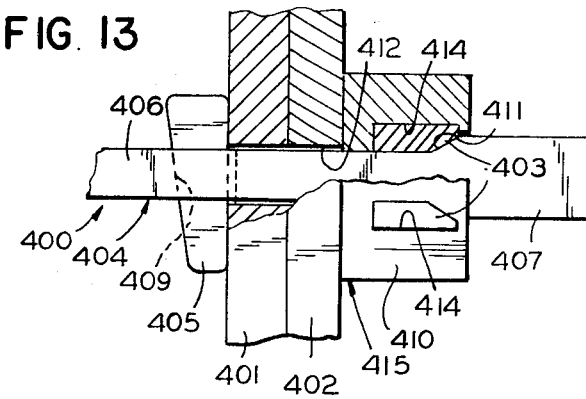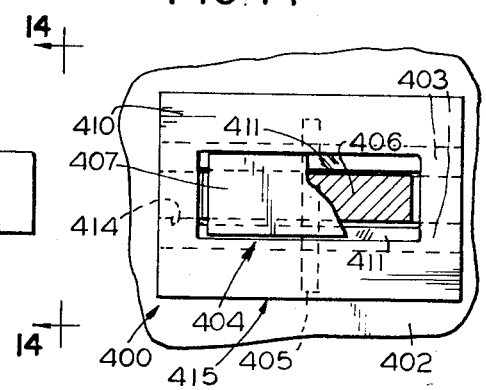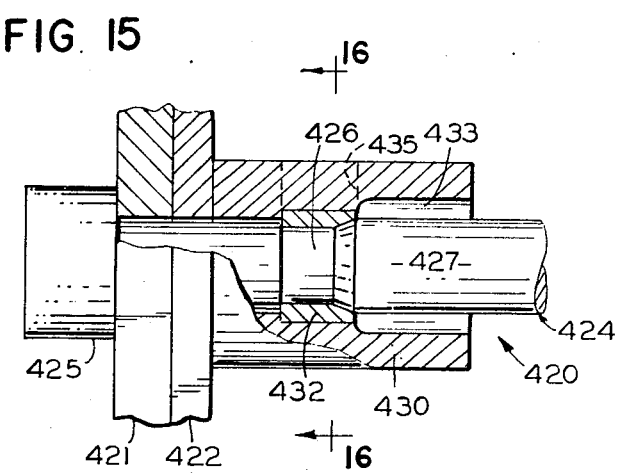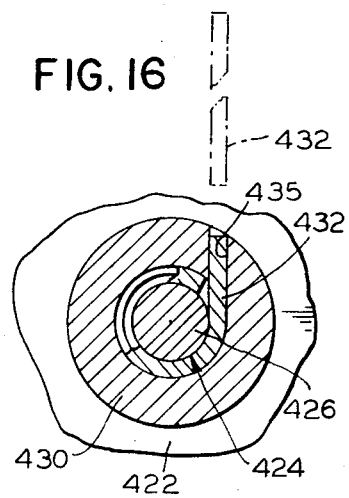

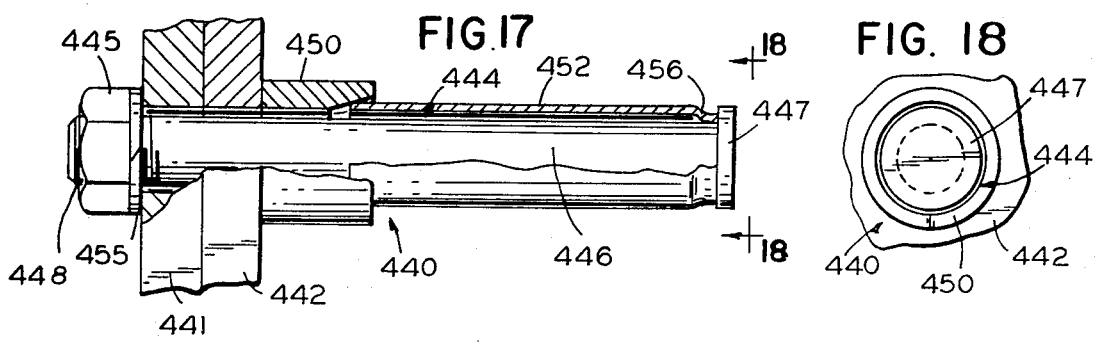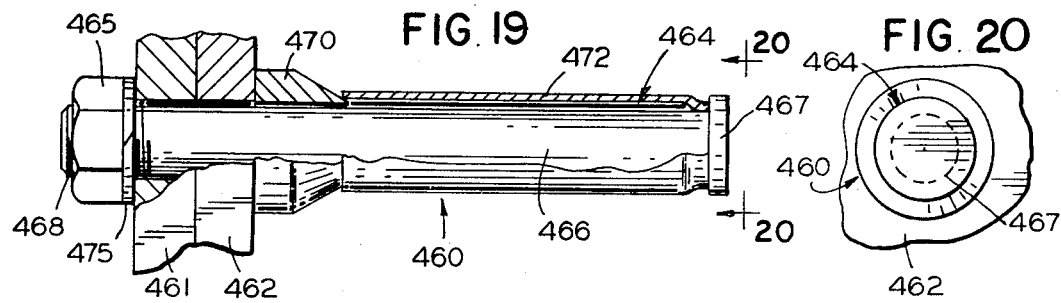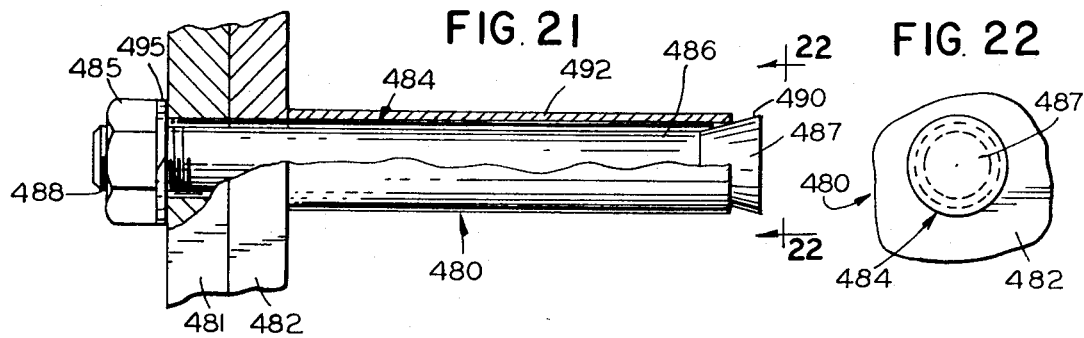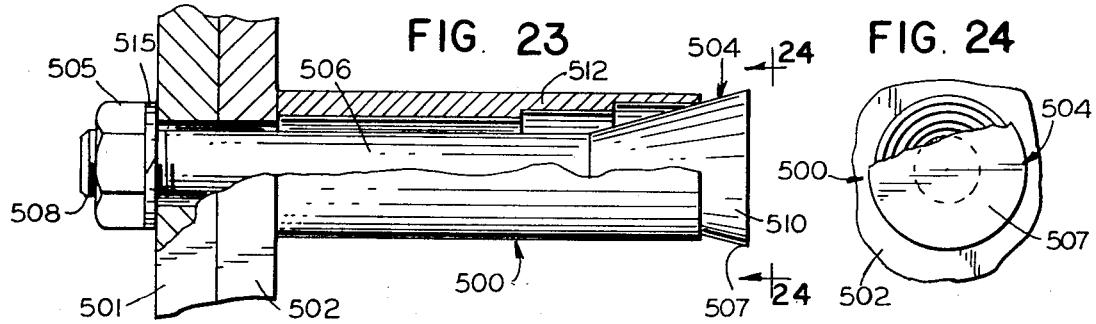

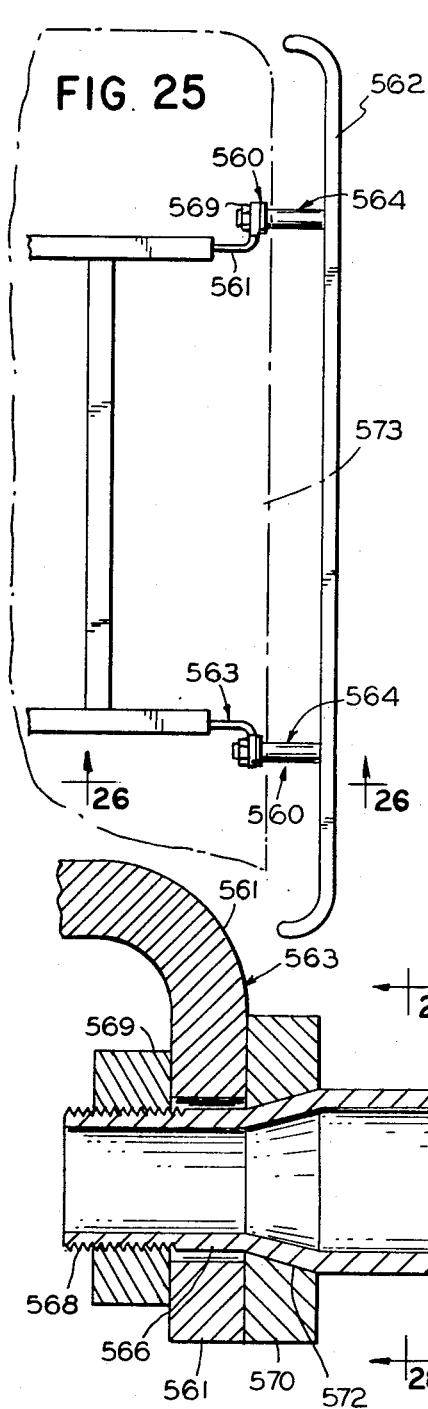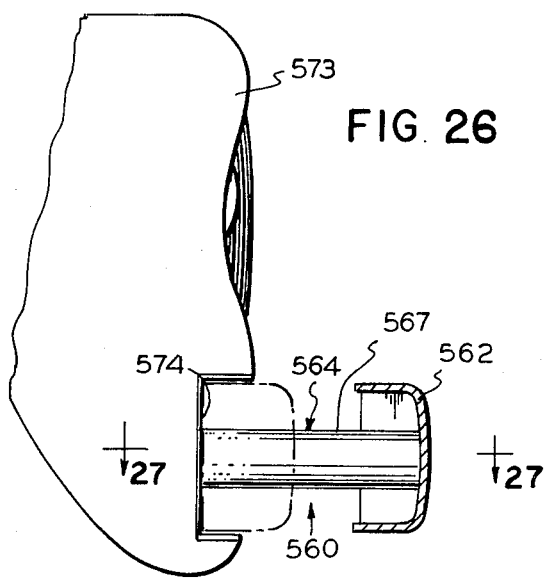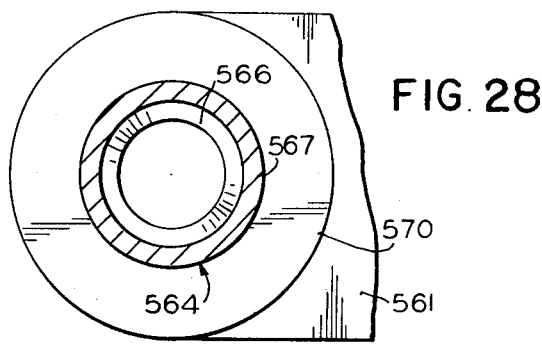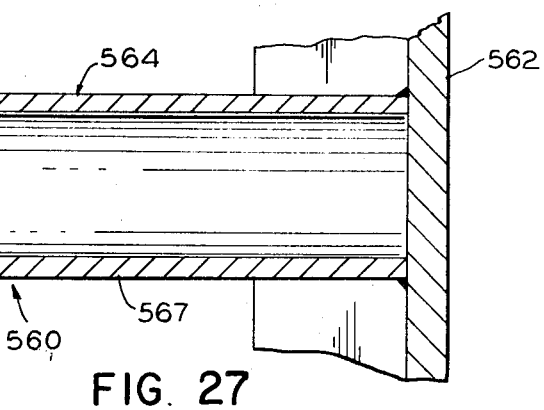

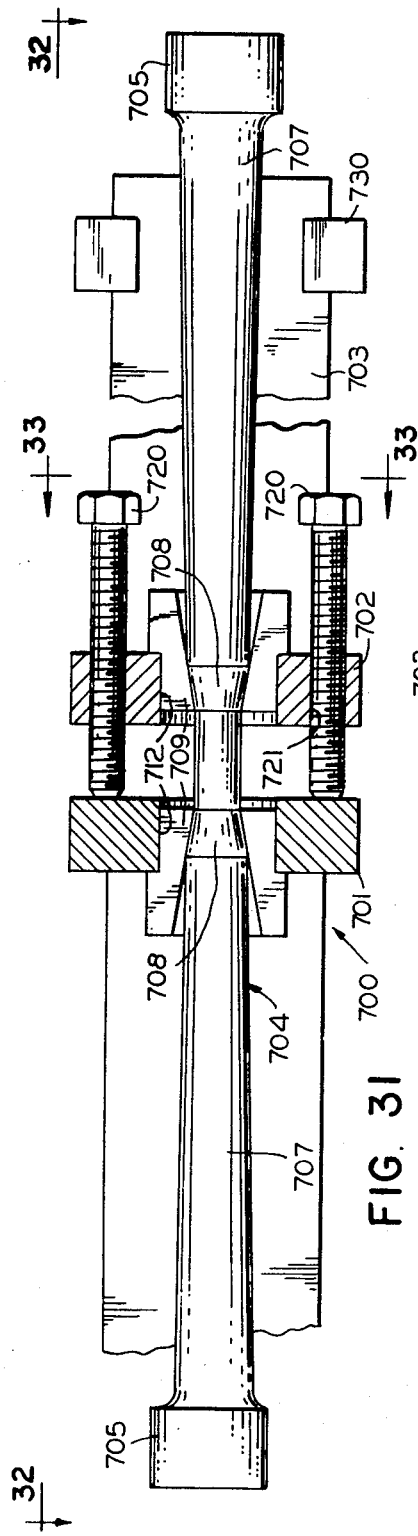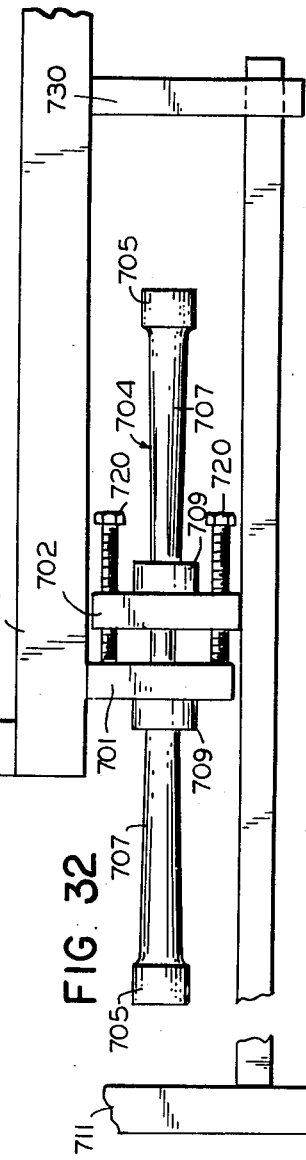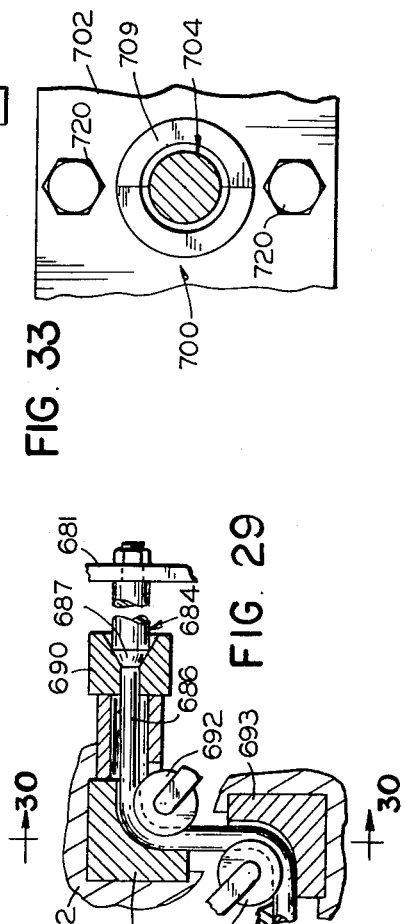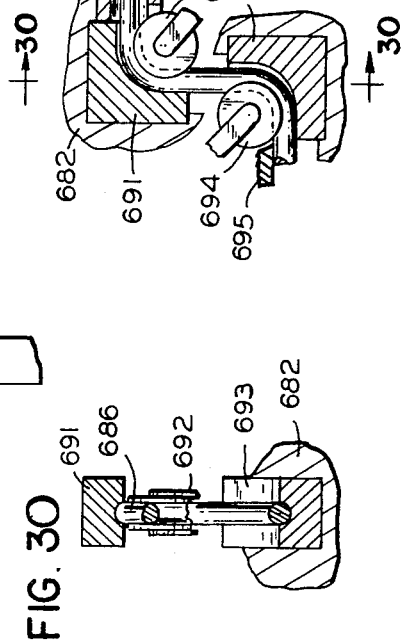

ENERGY ABSORBING STRUCTURES

DESCRIPTION

This invention relates to improved energy absorbing structures and more particularly to energy absorbing fastener structures.

An object of the invention is to provide improved energy absorbing structures.

Another object of the invention is to provide energy absorbing drawable fastener structures.

A further object of the invention is to provide simple, inexpensive energy absorbing structures of low weight and high energy absorbing capacity.

Another object of the invention is to provide improved energy absorbing structures which can be used as bolts to fasten members together in close or abutting proximity.

Another object of the invention is to provide energy absorbing units having wedging, slack takeup structures.

Another object of the invention is to provide an easily manufactured drawable rod having a shank and a head and a drawable portion of the same diameter.

Another object of the invention is to provide an energy absorbing fastener unit in which a die is secured to a threaded plug by a frangible portion.

Another object of the invention is to provide capscrew-like drawable rods pressing against dies to secure members together.

Another object of the invention is to provide energy absorbing fasteners in which drawing dies draw drawable members to rectangular shapes.

Another object of the invention is to provide an energy absorbing fastening unit in which a drawing die initially in the form of a bar is bent into a collar as it is inserted into a slot in a die holder.

Another object of the invention is to provide an extrudable sleeve held by a bolt against a reducing die.

Another object of the invention is to provide energy absorbing fastener units including sleeves held against sleeve expanding or splitting members.

Another object of the invention is to provide an energy absorbing fastener structure in which extrudable tubes carrying a vehicle bumper extend through extruding dies mounted on a vehicle frame and are secured to the frame.

Another object of the invention is to provide an energy absorbing fastener structure in which a drawable rod is drawn through a bending die and a drawing die.

Another object of the invention is to provide an energy absorbing fastener structure having a drawable rod having two drawable portions at opposite ends of a shank thereof.

Another object of the invention is to provide an energy absorbing fastener structure having a drawable rod provided with two tapered drawable portions at opposite ends of a shank thereof.

In the drawings:

FIG. 5 is a fragmentary, partially sectional view of an energy absorbing fastener unit forming an alternate embodiment of the invention;

FIG. 6 is an end view of the fastener unit of FIG. 5;

FIG. 7 is a fragmentary, partially sectional view of an energy absorbing fastener unit forming an alternate embodiment of the invention;

FIG. 8 is an end view of the fastener unit of FIG. 7;

FIG. 9 is a fragmentary, partially sectional view of an energy absorbing fastener unit forming an alternate embodiment of the invention;

FIG. 10 is an end view of the fastener unit of FIG. 9;

FIG. 11 is a fragmentary, partially sectional view of an energy absorbing fastener unit forming an alternate embodiment of the invention;

FIG. 12 is a sectional view taken along line 12—12 of FIG. 11;

FIG. 13 is a fragmentary, partially sectional view of an energy absorbing fastener unit forming an alternate embodiment of the invention;

FIG. 14 is a fragmentary, end view taken along line 14—14 of FIG. 13;

FIG. 15 is a fragmentary, partially sectional view of an energy absorbing fastener unit forming an alternate embodiment of the invention;

FIG. 16 is a fragmentary, sectional view taken along line 16—16 of FIG. 15;

FIG. 17 is a fragmentary, partially sectional view of an energy absorbing fastener unit forming an alternate embodiment of the invention;

FIG. 18 is a fragmentary, end view taken along line 18—18 of FIG. 17;

FIG. 19 is a fragmentary, partially sectional view of an energy absorbing fastener unit forming an alternate embodiment of the invention;

FIG. 20 is a fragmentary, end view taken along line 20—20 of FIG. 19;

FIG. 21 is a fragmentary, partially sectional view of an energy absorbing fastener unit forming an alternate embodiment of the invention;

FIG. 22 is a fragmentary, end view taken along line 22—22 of FIG. 21;

FIG. 23 is a fragmentary, partially sectional view of an energy absorbing fastener unit forming an alternate embodiment of the invention;

FIG. 24 is a fragmentary, end view taken along line 24—24 of FIG. 23;

FIG. 25 is a fragmentary, top plan view of a vehicle structure including energy absorbing fastener units and forming an alternate embodiment of the invention;

FIG. 26 is an enlarged, fragmentary, vertical sectional view taken along line 26—26 of FIG. 25;

FIG. 27 is an enlarged, fragmentary, horizontal sectional view taken along line 27—27 of FIG. 26;

FIG. 28 is an enlarged, fragmentary, vertical sectional view taken along line 28—28 of FIG. 27;

FIG. 29 is a fragmentary, partially sectional view of an energy absorbing fastener structure forming an alternate embodiment of the invention;

FIG. 30 is a vertical, sectional view taken along line 30—30 of FIG. 29;

FIG. 31 is a fragmentary side elevation view of a vehicle structure forming an alternate embodiment of the invention;

FIG. 32 is a top plan view taken along line 32—32 of FIG. 31; and

FIG. 33 is an enlarged vertical, sectional view taken along line 33—33 of FIG. 31.

EMBODIMENT OF FIG. 1

Figure 1:
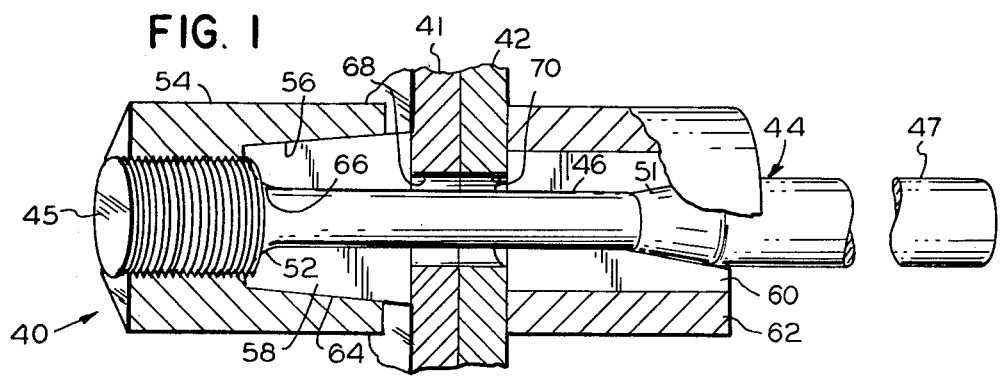
FIG. 1 is a sectional, perspective view of an energy absorbing fastener unit forming one embodiment of the invention.

Referring now in detail to the drawings, there is shown in FIG. 1 an energy absorbing fastener unit 40 forming one embodiment of the invention, serving to hold plate-like members 41 and 42 together for separating forces not greater than a predetermined minimum force and to draw a drawable portion 47 of a drawable rod 44 when a force higher than that predetermined minimum force occurs. The rod has a shank 46, a tapered transition portion 51 and a threaded head 45 of a diameter nominally the same as that of the drawable portion 47 and joined to the head by a shouldered or abrupt, transition or filleted portion 52. A cupped nut 54 having a frustoconical counterbore 56 is screwed onto the head 45 to wedge a split locking collar 58 tightly against the rod and against the head 45 to clamp the members 41 and 42 tightly between the collar and a split drawing die 60, the halves of which are held together by a ring 62 bonded to the die 60. The collar 58 has a frustoconical exterior surface 64 and an end surface 66 complementary to the steeply sloping transition portion 52. The plate members 41 and 42 have aligned bores 68 and 70 of a diameter slightly larger than that of the head 45 and the drawable portion 47.

Since the head 45 is of the same diameter as the drawable portion, the rod 44 can be inexpensively made by turning the shank 46 and portions 51 and 52 and rolling or otherwise forming the threads on the head. This makes the rod, which is the only part usually destroyed, for reuse by the drawing of the rod, easily replaceable. The rod 44 may be of a hardened steel, preferably of uniform hardness throughout, the drawable portion 47 being sufficiently soft to be drawn, the hardness preferably being from about 50 to about 55 on the Rockwell C scale. The rod may be of 4140 steel or one of the commercially available steels like the 4140 but more easily machined. The rod is preferably heat treated to provide a tensile strength of from 190,000 to 200,000 pounds per square inch, uniform throughout the rod. The rod also may be of other drawable material, such as for example, copper, aluminum or of a harder steel.

The fastener unit 40 holds the members 41 and 42 together until a predetermined force higher than usually encountered, is exerted on the members to separate them. Then the portion 47 of the rod is drawn by the die and absorbs the force which is separating the members.

The energy absorbing capacity of the unit 40 is high relative to the weight and size thereof. This is made possible by having the strength of the head and the nut and the die each as great as the tensile strength of the shank. The ratio of the drawing force required to draw the rod to the tensile strength of the shank is designated as the "stress ratio" of the unit, and the unit has a high stress ratio. The energy absorption is due primarily to the internal deformation of the rod as it is drawn but also includes the friction between the die and the surface of the transition portion 51 which is converted into heat. To provide a high stress ratio the difference in the diameters of the drawable portion 47 and the shank 46 is so chosen that the resistance to pulling the drawable portion through the die (the drawing and friction forces) is not substantially less than 40 percent of the tensile strength of the shank and is not substantially greater than 90 percent of that tensile strength of the shank. The head 45 has such diameter and such length that it does not fail during the drawing of the portion 47, the strength of the head preferably being at least as great as the tensile strength of the shank. The fillet 52 is provided at the juncture of the head and the shank to prevent stress concentration. The diameter and length of the nut and the size of the threads of the nut and the head are sufficient to provide strength at least as great as the tensile strength of the shank.

To minimize friction of the taper of the semi-cone angle of the drawing portion of the die 60 should not be substantially less than 50° and not substantially more than 15°. This somewhat lessens the total drawing force required but avoids any possibility of melting or plasticity from excessive heat. Friction also is kept low by coating the portions 51 and 47 of the rod and the die interior surface with a lubricant. The lubricant preferably forms a tought, corrosion-resistant coating, and may be lead and also may be a polymer, such as for example, "Mil-Bond Draw Lubricant." The entire assembled unit 40 may be dipped in the lubricant or sprayed with the lubricant or the several parts may be coated individually. In instances where a higher initial energy absorbing force is desired, the lubricant may be omitted from the interior of the die and the portions 51, and applied to the portion 47, this construction providing a high initial energy absorption rate followed by a lower energy absorption rate.

EMBODIMENT OF FIG. 2

An energy absorbing fastener unit 80 forming an alternate embodiment of the invention serves to hold plate members 81 and 82 together for any separating force not greater than a predetermined minimum force and to absorb a large portion of any separating force greater than that predetermined minimum force. The unit includes a drawable rod 84 generally like the rod 44 and having an enlarged head 85, a shank 86, a drawable portion 87, a filleted transition portion 92 joining the head and the shank, and a tapered transition portion 91 joining the head and shank. A snap ring 95 is adapted to be snapped over the shank 86 and a flanged split die 90 fits into a hole 93 in the member 82, the member 81 having a hole 94 therein of about the same size as the hole 93. The rod 84 preferably is of ductile steel and the die is substantially harder.

EMBODIMENT OF FIG. 3

An energy absorbing fastener unit 100 forming an alternate embodiment of the invention serves to hold plate members 101 and 102 together for any separating force not greater than a predetermined minimum and, when a higher separating force occurs, to draw a drawable portion 107 of a drawable rod 104 to dissipate much of the energy of that force. The rod is like the rod 44 (FIG. 1) except as brought out below. The rod includes a shank 106, an externally threaded head 105 much larger in diameter than the drawable portion 107, a tapered transition portion 111, a filleted portion 112 joining the head to the shank and a driving slot 113 for a screwdriver. An elongated nut 114 serves, after halves of a flanged split die 110 are placed on the shank 106, to pull the die against the member 102 and to bear against the members 101 to clamp them tightly together. The members 101 and 102 have bores 115 and 116 through which the portion 107 of the rod 104 can be inserted during assembly. The shank 106 is sufficiently long that, with the head 105 to the left of the plate member 101, the die halves can be placed on the shank completely to the right of the plate member 102.

EMBODIMENT OF FIG. 4

Figure 2:
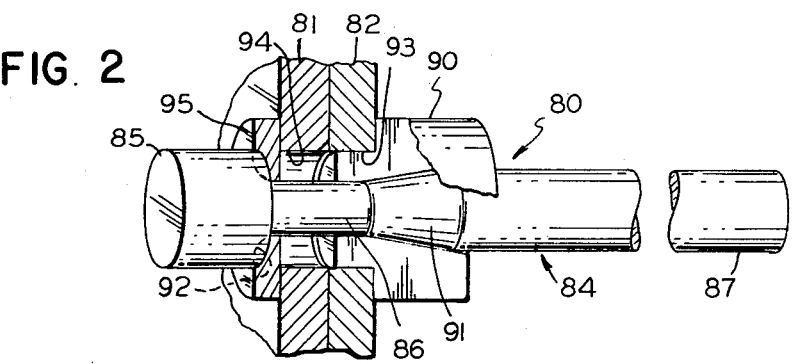
FIG. 2 is a sectional view of an energy absorbing fastener unit forming an alternate embodiment of the invention.
Figure 3:
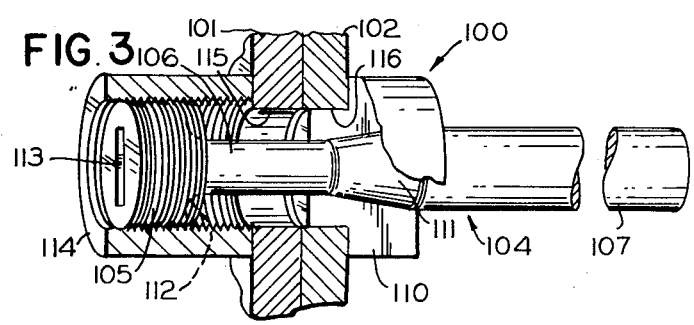
FIG. 3 is a sectional view of an energy absorbing fastener unit forming an alternate embodiment of the invention.
Figure 4:
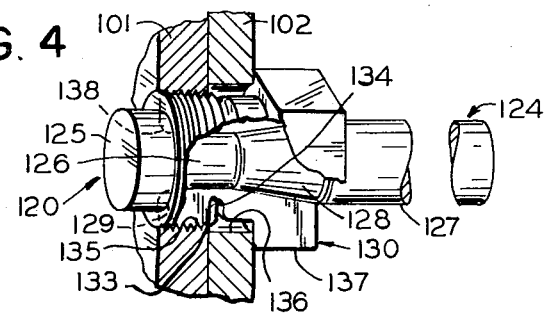
FIG. 4 is a sectional view of an energy absorbing fastener unit forming an alternate embodiment of the invention.

An energy absorbing fastener unit 120 forming an alternate embodiment of the invention holds plate members 121 and 122 together against any separating force not greater than a predetermined minimum separating force and serves to dissipate much of any separating force greater than that minimum force by drawing a drawable portion 127 of a drawable rod 124, which is like the rod 84 (FIG. 2). The fastener unit includes only the rod and two halves of a flanged, split drawing die 130. The die has an externally threaded plug 131 connected to a shank portion 132 by a frangible portion 133 formed by an external annular groove 134. The plug 131 is screwed into tapped bore 135 in the member 121 and the shank portion extends into bore 136 with a flange 137 of the die bearing against the member 122. The rod has a head 125, a shank 126, a tapered transition portion 128 joining the shank to the drawable portion 127 and a filleted, steeply sloping portion 129 joining the head and the shank and fitting into a complementary portion 138 of the die 130. The head 125 and the drawable portion 127 are of the same diameter so that the rod 124 may be made from rod stock by a simple turning operation forming the shank and transition portions. The flange 137 has driving flats thereon for screwing the plug into the tapped bore 135.

The unit 120 holds the members 121 and 122 together until a separating force higher than the predetermined minimum force is reached which is the breaking strength of the frangible portion 133. Then the portion 133 breaks. Preferably the braking strength of the portion is somewhat higher than the force necessary to draw the drawable portion 127 through the die. If so, initially there is a high instantaneous, energy dissipation during breaking of the portion 133, and then there is a lower, sustained absorption of energy while the portion 127 is drawn.

EMBODIMENT OF FIGS. 5 AND 6

An energy absorbing fastener unit 320 forming an alternate embodiment of the invention has a bolt-like drawable rod 324 having a long shank 326. The unit 320 secures plate members 321 and 322 in abutment with a spacer sleeve 331 on the shank portion 326. Elongated, drawable portion 327 of the rod 324 abuts integral die 330, and a nut 325 and a washer 332 on threaded end portion 328 of the shank hold the shank under tension. The rod preferably is of the same material as the rod 44 (FIG. 1). The threaded portion of the rod is weaker than the shank so that the drawable portion has to be more easily drawn than is the portion 47 of the rod 44 (FIG. 1) and the unit 320 does not have a high stress ratio.

EMBODIMENT OF FIGS. 7 AND 8

An energy absorbing fastener unit 340 forming an alternate embodiment of the invention is generally like the unit 320 and includes a capscrew-like, drawable rod 344 having a shank 346 having a threaded portion 348, and also including an elongated, enlarged, head-like drawable portion 347 abutting a split die 350 held in a cupped bushing 343 screwed into an elongated nut 345. The nut abuts plate member 342 and the threaded portion 348 is screwed into tapped bore 349 in member 341 against which the plate member 342 is held by the fastener unit 340. The bushing has driving flats 353 and the portion 347 has an Allen head socket 355.

EMBODIMENT OF FIGS. 9 AND 10

An energy absorbing fastener unit 360 forming an alternate embodiment of the invention includes a capscrew-like, drawable rod 364 having a shank portion 366 having a threaded end portion 368. The rod 364 also has an elongated, drawable head 367 which may have an Allen head socket 375 though this may be omitted. The head 367 engages washer-like integral die 370 and is screwed into tapped bore 369 to secure members 361 and 362 together. The rod and die are generally like the rod 324 and die 330 but the portion 367 and the die are rectangular in transverse cross section to produce a rectangular draw.

EMBODIMENT OF FIGS. 11 AND 12

An energy absorbing fastener unit 380 forming an alternate embodiment of the invention includes a drawable bolt member 384 having a reduced, flattened shank 386, a threaded end portion 388 and an elongated, enlarged drawable portion 387. Drawing die bars 390 having tapered planar drawing surfaces are adapted to draw the portion 387 in one plane only. The die bars 390 fit into square socket 391 in cupped die holder 393. A nut 395 screwed on the threaded portion 388 and the die holder 393 normally hold members 381 and 382 together. Upon excessive separating force being applied to the members 381 and 382, the die bars 390 draw the portions 387 to absorb the energy. The portion 388 is large and of a strength as great as that of the shank so that the portion 387 may be large enough to secure a large drawing force. The thread of the portion should be fine or shallow with a round bottom and/or rolled to be favorable to a low stress riser.

EMBODIMENT OF FIGS. 13 AND 14

An energy absorbing fastener unit 400 forming an alternate embodiment of the invention includes a drawable plate or bar 404 having a thinner shank 406 and a thicker, elongated, drawable head portion 407. A wedge 405 driven through a slot 409 holds the head portion 407 against opposed, wedge-like, drawing surfaces 411 of a die 415, and the head portion is drawn when pulled through the die, a relieved or clearance portion 412 being provided at the exit of the die. The head portion may, if desired, be enlarged and the wedge 405 omitted. Drawing bar inserts 403 of the die are insertable into complementary holes in die holder 410 of the die.

EMBODIMENT OF FIGS. 15 AND 16

An energy absorbing fastener unit 420 forming an alternate embodiment of the invention includes a fastener pin or rod 424 having a shank 426 and a head 427. A head 425 on the rod serves with the rod, a die holder 430 and a drawing die strip 432, to normally hold plate members 421 and 422 together. However, when an excessive separating force is applied to the members 421 and 422, the die strip draws the portion 427 to a smaller diameter to absorb the excessive force. The die holder 430 is provided with a tangential entrance slot 435 to permit insertion of the die strip 432 into the die, the strip 432 initially, before installation, being straight, and after installation, being in the form of an annulus or sleeve. The strip is, of course, harder and more ductile than the portion 427 and preferably has a hardness of greater than 60 on the Rockwell C scale, the portion preferably being of steel having a hardness of from 50 to 55 on the Rockwell C scale.

EMBODIMENT OF FIGS. 17 AND 18

An energy absorbing fastener unit 440 forming an alternate embodiment of the invention includes a bolt or rod 444 having a head 447, a shank 446, a threaded end portion 448 receiving a nut 445 and a washer 455, a drawing or extruding die 450 and a replaceable, drawable sleeve 452. The unit 440 normally holds plate members 441 and 442 together, but when an excessive separating force occurs, the head 447 of the rod 444 pushes the sleeve 452 through the drawing die 450 to reduce the tube and absorb the excess force. The sleeve is freely slidable on the shank 446 so that as the sleeve is elongated by the drawing thereof, the forward end of the sleeve can slide along the rod. The head 447 is able to move freely through the die, and rear end portion 456 of the sleeve is reduced so as to abut the head.

EMBODIMENT OF FIGS. 19 AND 20

An energy absorbing fastener unit 460 forming an alternate embodiment of the invention is like the unit 440 (FIG. 24) except that the unit 460 has a splitting and rolling or curling die 470 rather than the drawing die 450, and expands, splits and rolls a tube or sleeve 472 of a ductile metal. A fastening bolt or rod 464 has a shank 466 and a head 467, and a nut 465 and a washer 475 on a threaded end portion 468 tension the bolt and hold the sleeve against the die 470 and the die against the plate member 462 to normally hold plate members 461 and 462 together. Upon occurrence of an excessive separating force, the head 467 presses the sleeve to the left as viewed in FIG. 42, to expand, split and roll the sleeve to absorb the excessive force. The sleeve may be replaced after such an occurrence.

EMBODIMENT OF FIGS. 21 AND 22

An energy absorbing fastener unit 480 forming an alternate embodiment of the invention serves to normally hold plate members 481 and 482 together and, when an excessive separating force is placed on the members 481 and 482 to expand and possibly split and roll a replaceable tube or sleeve 492 of ductile metal. The unit includes a bolt 484 having a shank 486 and a head 487 having a frustoconical expanding die surface 490. A nut 485 and a washer 495 are on a threaded end portion 488 of the shank.

EMBODIMENT OF FIGS. 23 AND 24

An energy absorbing fastener unit 500 forming an alternate embodiment of the invention serves to normally hold plate members 501 and 502 together and to absorb any excessive force. The unit 500 is identical with the unit 480 (FIG. 21) except that the unit 500 has an internally stepped sleeve 512 which is progressively expanded by a head 507 of a bolt 504 having a shank 506 on a threaded end portion 508 on which are positioned a nut 505 and a washer 511. The head 507 has a frustoconical die surface 510 to expand and possibly split and roll the tube. While the tube is shown as internally stepped to progressively increase the amount of energy absorbed, the tube may be stepped externally instead of internally.

EMBODIMENT OF FIGS. 25 TO 28

An energy absorbing bumper structure forming an alternate embodiment of the invention includes energy absorbing fastener units 560 mounting a bumper 562 on ear members 561 forming rigid portions of an automobile chassis frame 563. Each unit 560 includes an extrudable tube 564 having an enlarged drawable portion 567 welded to the bumper, a shank portion 566 threaded at 568, and a tapered transition portion 571 fitting into a tapered, washer-like drawing die 570. A nut 569 screwed onto the portion 568 draws the portion 567 tightly into the die 570 and presses the die tightly against the ear member 561. Normally the tubes 564 mount the bumper 562 in the full line positions thereof shown in FIGS. 38, 39 and 40 spaced forwardly from body 573. However, when a collision of sufficient force occurs, the tubes 564 are extruded through the dies to dissipate the excessive force and the bumper moves into a slot-like well 574 (FIG. 26) in the fender and front end structure of the automobile.

EMBODIMENT OF FIGS. 29 AND 30.

An energy absorbing fastener device forming an alternate embodiment of the invention includes a drawable rod 684 having a bendable shank 686 and an elongated, enlarged extrudable portion 687 leaving a reduced, threaded end portion 689 to which a bumper member 681 is secured by a nut 685. The shank 686 extends partially into a bending die 691 and partly around a guide roller 692, both held by a member 682, to hold the drawable portion 684 against an extruding die 690 held by the member 682. A reverse bending die 693 and a guide roller 694 also are held by the member 682. When excessive force occurs, the bumper pushes the extrudable portion 687 through the drawing die 690 and pushes the shank 686 through the bending dies 691 and 693. A stripper 695 straightens the rod. Thus, both extruding and triple bending occur to absorb the excessive force.

EMBODIMENT OF FIGS. 31 TO 33

An energy absorbing structure forming an alternate embodiment of the invention includes a pair of fastener devices 700 normally holding ears 701 against movement relative to ears 702. The ears 701 are rigid with an automobile's longitudinal frame members 703 and the ears 702 are rigid with bars 710 carrying a bumper 711 of the automobile, only one of the devices 700 being shown, the other being at the other side of the frame 703. The device 700 includes a drawable rod 704 having a shank 706 and drawable portion 707 at opposite ends of the shank. The rod has tapered transition portions 708 abutting flanged split dies 709 fitting closely in aligned holes 712 in the ears. The portions 707 are identical but are reverse handed. That is, the rod is symmetrical. The portions 707 are tapered slightly from smaller at the inner ends thereof to larger at the outer ends so that when excessive force occurs, both portions 707 are drawn despite manufacturing imperfections in size or ductility of the portions 707.

Enlarged stop heads 705 are provided at each end of the rod to prevent further drawing once both heads abut the dies. If desired, the tapers of the dies 709 could be different and the portions 707 untapered to cause the portions 707 to be drawn sequentially.

To take up slack, long adjustment screws 720 are screwed through tapped bores 721 in the ear 702 and abut the ear 701. This permits takeup after partial drawing. Whenever the screws 720 are loose, a rattle will occur to indicate that they should be tightened. A guide 730 on the frame 703 guides the member 710 along the frame and supports the member 710. Instead of the adjustment screws 720, spring wedges or solid wedges may be used to separate the members 701 and 702.

What is claimed is:

1. In an energy absorbing fastener structure, a drawable rod having a cylindrical shank having a predetermined diameter, a cylindrical drawable portion of a larger diameter at one end of the shank and a head of a larger transverse dimension than said predetermined diameter at the other end of the shank so that the strength of the head is substantially greater than that of the shank, the drawable portion being joined to the shank by a tapered transition portion, and a tubular member having an internally threaded plug portion, a flanged internally tapered die portion and a frangible portion defining the minimum cross-sectional area of the tubular member joining the plug portion and the die portion, the tubular member being positioned on the shank with the die portion in substantial abutment with the drawable portion and with the plug portion in substantial abutment with the head.

2. The fastener structure of claim 1 wherein the frangible portion has a predetermined tensile strength and the shank has a tensile strength different from said predetermined tensile strength.

* * * * *